United States Patent [19]

Douglas

[11] 4,072,630

[45] Feb. 7, 1978

[54] METAL PHTHALOCYANINE CATALYST PREPARATION

[75] Inventor: Walter M. Douglas, Streamwood, Ill.

[73] Assignee: UOP Inc., Des Plaines, Ill.

[21] Appl. No.: 658,791

[22] Filed: Feb. 17, 1976

[51] Int. Cl.² .............................................. B01J 27/24
[52] U.S. Cl. .................... 252/430; 252/428; 252/429 R; 252/431 N; 208/191; 208/207
[58] Field of Search ................... 252/428, 429 R, 430, 252/431 N

[56] References Cited

U.S. PATENT DOCUMENTS

| | | | |
|---|---|---|---|
| 3,029,201 | 4/1962 | Brown et al. | 252/431 N X |
| 3,108,081 | 10/1963 | Gleim et al. | 252/428 |
| 3,230,180 | 1/1966 | Larson | 252/431 N |

*Primary Examiner*—Patrick P. Garvin
*Attorney, Agent, or Firm*—James R. Hoatson, Jr.; Robert W. Welch; William H. Page, II

[57] ABSTRACT

A method of preparing a supported metal phthalocyanine catalyst. A solid adsorbent support or carrier material is impregnated with an alkali metal phthalocyanine solution and with a metal salt solution comprising a metal exchangeable with said alkali metal to form a desired metal phthalocyanine catalyst.

10 Claims, No Drawings

METAL PHTHALOCYANINE CATALYST PREPARATION

This invention relates to a novel method of preparing a supported metal phthalocyanine catalyst. Metal phthalocyanines have assumed considerable importance as catalysts, particularly in the treatment of sour petroleum distillates including cracked, straight run and natural gasolines, and also naphtha, kerosine, jet fuel, fuel oil, and the like. In the treatment of sour petroleum distillates, mercaptans contained therein are oxidized to disulfides in contact with an oxidizing agent and small concentrations of metal phthalocyanine catalyst dissolved or suspended in an aqueous caustic solution, the disulfides being recovered in said caustic solution.

Certain of the metal phthalocyanines, notably cobalt phthalocyanine, are known for their per se ability to catalyze the oxidation of mercaptans contained in a sour petroleum distillate. However, although said metal phthalocyanines are of themselves active oxidation catalysts in this respect, they have found little if any acceptance as such in treatment of sour petroleum distillates. This stems from the general insolubility characteristics of the metal phthalocyanines precluding their use in liquid-liquid treating systems and in fixed bed treating systems requiring impregnation of the metal phthalocyanine on a solid support or carrier material from an impregnating solution thereof.

It has therefore been the practice to enhance the solubility of the metal phthalocyanine molecule by substituting thereon one or more solubilizing groups — typically one or more sulfonate groups. It has been observed that not only does the addition of said solubilizing groups detract from the activity of the metal phthalocyanines, but also that when said metal phthalocyanines are impregnated on a support or carrier material in a fixed bed treating system, the tendency to wash from the support or carrier material during the treating process increases with the increasing number of solubilizing groups.

It is therefore an object of this invention to present a novel method of preparing a supported metal phthalocyanine catalyst. It is a further object to present a novel method of preparing said metal phthalocyanine impregnated on a solid absorbent support or carrier material free of the deactivating influence of solubilizing substituents, and highly resistant to leaching from said support or carrier material.

In one of its broad aspects, the present invention embodies a method of preparing a supported metal phthalocyanine catalyst which comprises impregnating a solid absorbent support or carrier material with a solution of an alkali metal phthalocyanine and with a metal salt solution comprising a metal exchangeable with said alkali metal to form said metal phthalocyanine catalyst, and thereafter washing and drying the resulting supported metal phthalocyanine catalyst.

One of the more specific embodiments is in a method of preparing a supported cobalt phthalocyanine catalyst which comprises impregnating an activated charcoal support with an alcoholic or acetone solution of dilithium phthalocyanine and with an alcoholic or actone cobalt chloride solution, and thereafter washing and drying the resulting charcoal supported cobalt phthalocyanine catalyst.

Other objects and embodiments of this invention will become apparent in the following detailed specification.

The method of this invention is applicable to the preparation of a catalytic composite comprising a solid adsorbent carrier material and any of the various metal phthalocyanines, for example, iron phthalocyanine, cobalt phthalocyanine, copper phthalocyanine, vanadium phthalocyanine, manganese phthalocyanine, magnesium phthalocyanine, zinc phthalocyanine, titanium phthalocyanine, hafnium phthalocyanine, thorium phthalocyanine, tin phthalocyanine, lead phthalocyanine, columbium phthalocyanine, tantalum phthalocyanine, antimony phthalocyanine, bismuth phthalocyanine, chromium phthalocyanine, molybdenum phthalocyanine, nickel phthalocyanine, palladium phthaloycanine, platinum phthalocyanine, silver phthalocyanine, mercury phthalocyanine, and the like.

The present invention is applicable to the preparation of a metal phthalocyanine composited with any of the various and well-known adsorbent solid materials generally utilized as catalyst supports. Said adsorbent materials include the various charcoals produced by the destructive distillation of wood, peat, lignite, nut shells, bones, and other carbonaceous matter, and preferably such charcoals as have been treated, or chemically treated, or both, to form a highly porous particle structure of increased adsorbent capacity, and generally defined as activated carbon. Said adsorbent materials also include the naturally occurring clays and silicates, for example, diatomaceous earth, fuller's earth, kieselguhr, attapulgus clay, feldspar, montmorillonite, halloysite, kaolin, and the like, and also the naturally occurring or synthetically prepared refractory metal oxides such as aluminum, silica, zirconia, thoria, boria, etc., or combinations thereof like silica-alumina, silica-zirconia, alumina-zirconia, etc. In any case, a solid adsorbent material which has been activated by heat treatment, chemical treatment, or otherwise, to realize optimum porosity and adsorbent capacity of the same, is preferred.

Any particular solid adsorbent material is selected with regard to its stability under conditions of its intended use. For example, in the treatment of a sour petroleum distillate hereinabove described, the solid adsorbent carrier material should be insoluble in, and otherwise inert to, the aqueous caustic solution and the petroleum distillate at conditions existing in the treating zone. In the latter case, charcoal, and particularly activated carbon, is preferred because of its capacity for metal phthalocyanine and because of its stability under treating conditions. However, it should be observed that the method of this invention is also applicable to the preparation of metal phthalocyanines composited with any of the other well-known solid adsorbent carrier materials, particularly the refractory metal oxides. In one of the preferred embodiments of this invention the solid adsorbent carrier material is alumina.

Pursuant to the present invention, the selected solid adsorbent carrier material is first impregnated with a solution of an alkali metal phthalocyanine, preferably an alcohol or an acetone solution of an alkali metal phthalocyanine. Of the alkali metal phthalocyanines, that is, disodium phthalocyanine, dipotassium phthalocyanine, dilithium phthalocyanine, dirubidium phthalocyanine, and dicesium phthalocyanine, dilithium phthalocyanine is preferred. The alkali metal phthalocyanines are either commercially available or readily prepared by methods disclosed in the art. For example, the preferred dilithium phthalocyanine is prepared by the art-disclosed method whereby lithium is dissolved in an alcoholic solution of phthalonitrile and reacted therewith at an elevated temperature. The method and recovery of the product is hereinafter described in greater detail.

The alkali metal phthalocyanine can be impregnated on the support or carrier material in any suitable manner. In one method, the carrier material in the form of pills, rings, saddles, or other particles of uniform or irregular shape, is soaked, dipped, suspended, or otherwise immersed in a solution of said alkali metal phthalocyanine, preferably an alcoholic solution thereof. In another method, the solution may be sprayed onto, poured over, or otherwise contacted with the solid adsorbent carrier material. The excess solution may be removed in any convenient manner, for example, filtration, decantation, evaporation, etc. In any case, the alkali metal phthalocyanine-impregnated carrier material is further impregnated with a metal salt solution comprising a metal exchangeable with said alkali metal to form a desired metal phthalocyanine catalyst. Again, the alkali metal phthalocyanine-containing carrier material can be thus further impregnated in any conventional or otherwise convenient manner. One suitable method comprises preparing said metal salt solution, usually an alcoholic or acetone solution, and maintaining said solution in contact with said alkali metal phthalocyanine-containing carrier material at conditions permitting substantially complete metal cationic exchange between said metal salt and said alkali metal phthalocyanine. Said conditions include impregnation of the alkali metal phthalocyanine-containing carrier material with said metal salt solution by the process of suspending, soaking, dipping, or otherwise immersing or contacting said carrier material in or with said solution.

Substantially complete cation exchange is effected utilizing a stoichiometric excess of the metal salt sufficient to provide a metal/alkali metal phthalocyanine weight ratio generally in the range of from about 1.5:1 to about 3.0:1. The metal salt and the alkali metal phthalocyanine are suitably employed in amounts to yield a final catalyst comprising from about 0.5 to about 1.5 wt. % metal phthalocyanine, for example, cobalt phthalocyanine.

The following examples are presented in illustration of the method of this invention and are not intended as an undue limitation on the generally broad scope of the invention as set out in the appended claims.

EXAMPLE I

In the preparation of dilithium phthalocyanine according to the prior art, 8 grams of lithium metal are added to 120 grams of phthalonitrile suspended in 1 liter of n-pentanol. On dissolution of the lithium metal, the reaction mixture is heated for about 5 hours at about the boiling temperature thereof. When the reaction mixture has cooled to less than about 80° C., 2 liters of benzene are added thereto and the mixture allowed to set for approximately 3 hours. A crude dilithium phthalocyanine product is recovered by filtration and washed with diethyl ether. Further purification is effected by extraction with acetone, filtering and evaporating the acetone under vacuum. The dilithium phthalocyanine product is preferably stored in an air-tight container to obviate hydrolysis.

EXAMPLE II

In the preparation of a supported cobalt phthalocyanine catalyst pursuant to the method of this invention, 0.6 grams of the dilithium phthalocyanine is dissolved in approximately 1.5 liters of acetone. To this solution is added 200 grams of activated carbon, and the resultant mixture is slowly stirred for about 15 minutes to about 1 hour. After this time, 0.6 grams of cobalt chloride hexahydrate in 300 milliliters of anhydrous methanol is added to the mixture, and the resultant mixture further stirred for about 15 minutes to about 1 hour. The catalyst is then separated by filtration and air dried.

EXAMPLE III

In a variation of the procedure of Example II, the support is first loaded into a reactor, and the dilithium phthalocyanine impregnating solution passed upflow or downflow through the support bed. Subsequent to the completed deposition of the dilithium phthalocyanine on the support, the cobalt chloride hexahydrate solution is passed in contact therewith, either upflow or downflow, thereby forming the cobalt phthalocyanine catalyst deposited on the support. After the impregnating solvent is drained from the reactor, air is blown over the supported catalyst for a time sufficient to dry the same, the time required depending on the size and configuration of the reactor.

In either of the above described procedures, the order of impregnation can be reversed, that is, the support may be impregnated with the cobalt chloride heptahydrate followed by impregnation with the dilithium phthalocyanine. In any case, the resulting cobalt phthalocyanine catalyst is employed by first wetting the same with a caustic solution in accordance with prior art practice. The hydrocarbon feed, containing mercaptans and dissolved oxygen is then processed through the catalyst bed whereby the mercaptans are converted to disulfides.

I claim as my invention:

1. A method of preparing a supported metal phthalocyanine catalyst which comprises successively impregnating a solid adsorbent carrier material with a solution of an alkali metal phthalocyanine and with a metal salt solution comprising a metal exchangeable with said alkali metal, said metal salt being in sufficient amount to provide an exchange metal/alkali metal phthalocyanine weight ratio of from about 1.5:1 to about 3.0:1 and effecting a substantially complete metal cationic exchange between said metal salt and said alkali metal phthalocyanine.

2. The method of claim 1 further characterized in that the carrier material is initially impregnated with said phthalocyanine solution and thereafter with said metal salt solution.

3. The method of claim 1 further characterized in that said alkali metal phthalocyanine is dilithium phthalocyanine.

4. The method of claim 1 further characterized in that said solution of an alkali metal phthalocyanine is an alcoholic solution of dilithium phthalocyanine.

5. The method of claim 1 further characterized in that said supported metal phthalocyanine catalyst is a supported copper phthalocyanine catalyst and said metal salt is cupric chloride.

6. The method of claim 1 further characterized in that said supported metal phthalocyanine catalyst is a supported cobalt phthalocyanine catalyst and said metal salt is cobalt chloride.

7. The method of claim 1 further characterized in that said metal salt and said alkali metal phthalocyanine are employed in an amount to provide a catalyst comprising from about 0.5 to about 1.5% metal phthalocyanine.

8. The method of claim 1 further characterized in that said carrier material is an activated charcoal.

9. The method of claim 1 further characterized in that said carrier material is a refractory inorganic oxide.

10. The method of claim 1 further characterized in that said carrier material is an activated alumina.

* * * * *